United States Patent
Narayanan et al.

(10) Patent No.: US 7,965,459 B2
(45) Date of Patent: Jun. 21, 2011

(54) WAVELETS-BASED DETECTION OF PROXIMITY BETWEEN A SENSOR AND AN OBJECT

(75) Inventors: Ramakrishnan Narayanan, Pittsburgh, PA (US); Ju-il Lee, Sewickley, PA (US); Mark David Bedillion, Allison Park, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 221 days.

(21) Appl. No.: 12/338,375

(22) Filed: Dec. 18, 2008

(65) Prior Publication Data

US 2010/0157485 A1 Jun. 24, 2010

(51) Int. Cl.
G11B 27/36 (2006.01)
G11B 21/02 (2006.01)

(52) U.S. Cl. .......................................... 360/31; 360/75
(58) Field of Classification Search .................. None
See application file for complete search history.

(56) References Cited

U.S. PATENT DOCUMENTS

| | | |
|---|---|---|
| 4,795,981 A | 1/1989 | Ertingshausen et al. |
| 4,812,927 A | 3/1989 | Fechner |
| 5,742,446 A | 4/1998 | Tian et al. |
| 6,008,640 A | 12/1999 | Tan et al. |
| 6,181,520 B1 | 1/2001 | Fukuda |
| 6,417,982 B1 * | 7/2002 | Ottesen et al. ............. 360/77.02 |
| 6,757,343 B1 * | 6/2004 | Ortega et al. ................. 375/340 |
| 6,822,814 B2 | 11/2004 | Ng et al. |
| 6,958,871 B2 | 10/2005 | Hirano et al. |
| 7,190,547 B2 | 3/2007 | Khurshudov et al. |
| 7,292,401 B2 | 11/2007 | Shen et al. |
| 2005/0177321 A1 * | 8/2005 | Wang et al. ..................... 702/35 |
| 2006/0245110 A1 | 11/2006 | Hanchi et al. |
| 2007/0127148 A1 * | 6/2007 | Yokohata et al. .............. 360/31 |
| 2007/0291401 A1 * | 12/2007 | Sun et al. ........................ 360/75 |

OTHER PUBLICATIONS

Zhong-Heng Lin et al., "A Novel in Situ Monitoring Method for Head/Media Contact," IEEE Transactions on Magnetics, vol. 43, No. 6, pp. 2286-2288, Jun. 2007.

Andrei Khurshudov et al., "Head-Disk Contact Detection in the Hard-Disk Drives," Wear, vol. 255, pp. 1314-1322, 2003.

* cited by examiner

*Primary Examiner* — Daniell L Negrón
*Assistant Examiner* — Regina N Holder
(74) *Attorney, Agent, or Firm* — Alan G. Rego; Westman, Champlin & Kelly, P.A.

(57) ABSTRACT

A circuit includes a proximity detection component that applies wavelet analysis to a sensed signal from a sensor and responsively provides an output indicative of whether proximity exists between the sensor and an object that causes the sensor to produce the sensed signal.

20 Claims, 5 Drawing Sheets

US 7,965,459 B2

WAVELETS-BASED DETECTION OF PROXIMITY BETWEEN A SENSOR AND AN OBJECT

BACKGROUND

The present embodiments relate to contact detection, and more particularly to a technique, using wavelet analysis, for sensing proximity (contact and near-contact) between a sensor (for example, a read mechanism such as a slider) and an object (for example, a storage medium in a data storage device).

Mass storage devices are one of many components of modern computers. One type of mass storage device is a disc drive. A typical disc drive includes a head disc assembly (HDA) that has one or more magnetic discs which are rotated by a spindle motor at a substantially constant high speed and accessed by an array of read/write heads which store data on tracks defined on the disc surfaces. Each head is carried by a slider, which is designed to "fly" just over the surface of the rotating disc. Each slider is a part of a head-gimbal assembly (HGA), which also includes a suspension (beam and gimbal strut) for positioning the slider and an interconnect (for example, a flexible circuit) that carries electrical signals between the head and drive electronics. A printed circuit board assembly (PCBA), which includes electronics used to control the operation of the HDA, is typically mounted to the underside of the HDA to complete the disc drive.

As the density of data recorded on magnetic discs continues to increase, it is becoming necessary for the spacing between the head carried by the slider and the disc to decrease to very small distances. Spacings of well below 10 nanometers (nm) are required in some applications. In disc drive systems having such small slider-disc spacing, the possibility of contact between the slider and the disc is relatively high, due to factors such as slider manufacturing process limitations and limited air-bearing modeling capabilities. A system for detecting such contacts is useful for a number of diagnostic tests, enabling assessments such as component-level flyability and durability, drive-level reliability, and production-level screening to be made, as well as providing input to fly-height calibration and adaptive-fly-control systems that enable dynamic adjustment of flying height in certain disc drive systems.

SUMMARY

An aspect of the disclosure relates to detecting proximity (contact or near-contact) between a sensor (for example, a read mechanism such as a slider) and an object (for example, a data storage medium) by analyzing a sensed signal from the sensor.

In one apparatus embodiment, a circuit includes a proximity detection component that applies wavelet analysis to a sensed signal from a sensor and responsively provides an output indicative of whether proximity exists between the sensor and an object that causes the sensor to produce the sensed signal.

In another apparatus embodiment, a circuit includes a proximity detection component that utilizes a signal-analysis algorithm that is capable of analyzing any of a plurality of different types of sensed signals and responsively providing an output indicative of whether proximity exists between a read mechanism and a data storage medium In still another embodiment, a method of detecting proximity between a sensor and an object that causes the sensor to produce a sensed signal, is provided. The method includes receiving the sensed signal from the sensor and applying wavelet analysis to the received sensed signal. Based on results of the wavelet analysis of the sensed signal, an output indicative of whether proximity exists between the sensor and the object that causes the sensor to produce the sensed signal is provided.

These and various other features and advantages will become apparent upon reading the following detailed description and upon reviewing the associated drawings.

DETAILED DESCRIPTION

The present embodiments relate to sensing proximity (contact and near-contact) between a sensor (for example, a read mechanism such as a slider) and an object (for example, a storage medium in a data storage device). More particularly, embodiments of the sensor-object proximity detection scheme described below apply wavelet analysis to, for example, a readback signal, a position error signal (PES), a timing error signal or variants or derivatives of these signals to detect modulation or transients induced by motion of a sensor (for example, a read mechanism such as a slider) during sensor-object proximity. As will be described in detail further below, discrete versions of suitable wavelets can be applied and implemented in the form of digital filtering techniques for real-time proximity detection using wavelet analysis of the readback signal, PES or timing error signals. However, the sensor-object proximity detection scheme can in general be applied using continuous wavelet transforms (CWT) or discrete wavelet transforms (DWT). In accordance with a one embodiment, slider excitation modes during slider-medium contact or near-contact are first briefly addressed below in connection with FIGS. 1 and 2. Thereafter, general and specific embodiments of sensor-object proximity detection (for example, slider-medium proximity detection) are described in connection with the remaining figures.

Figure 1:
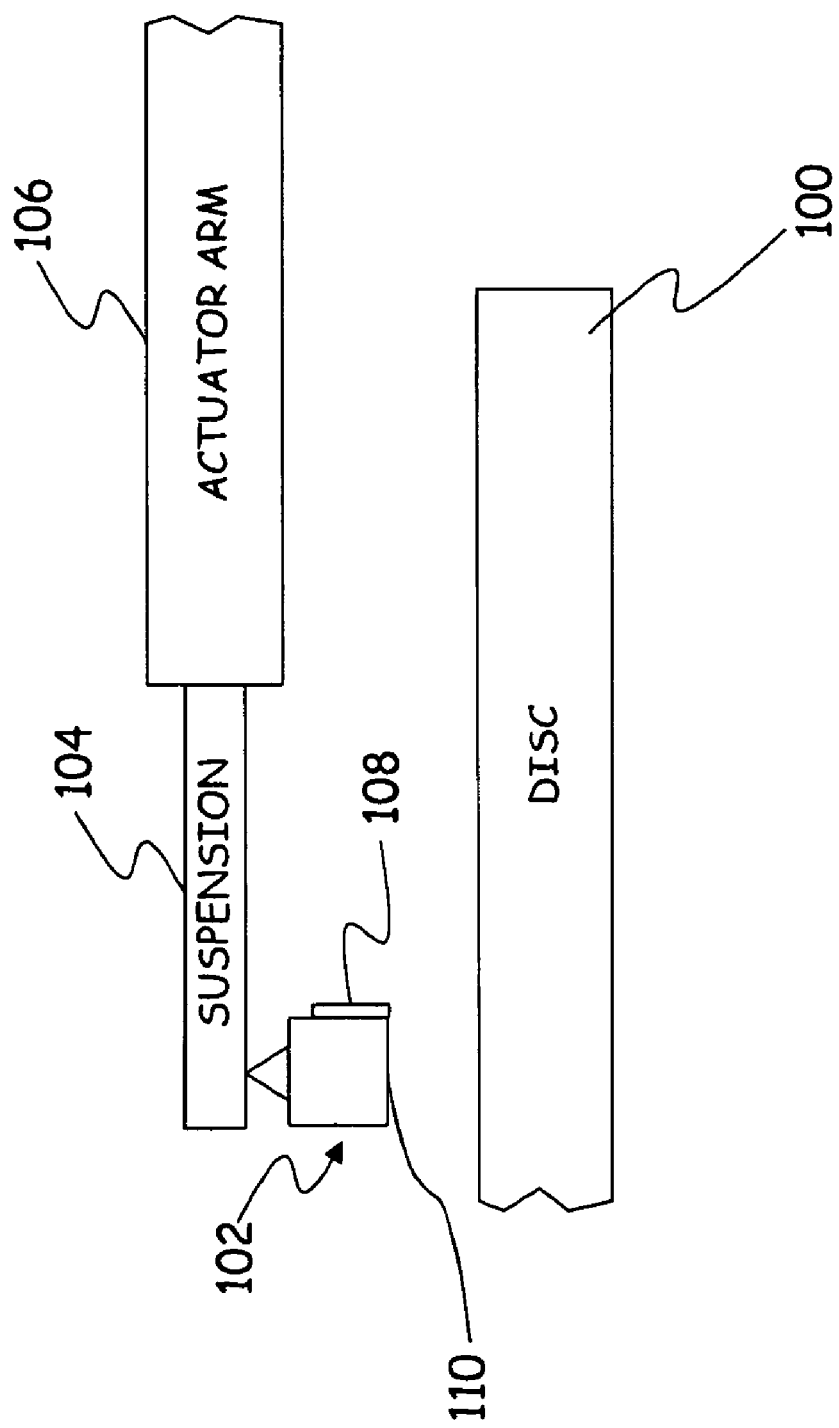
FIG. 1 is a diagrammatic illustration showing mechanical components of a data storage system that are of relevance to the present embodiments.
Figure 2:
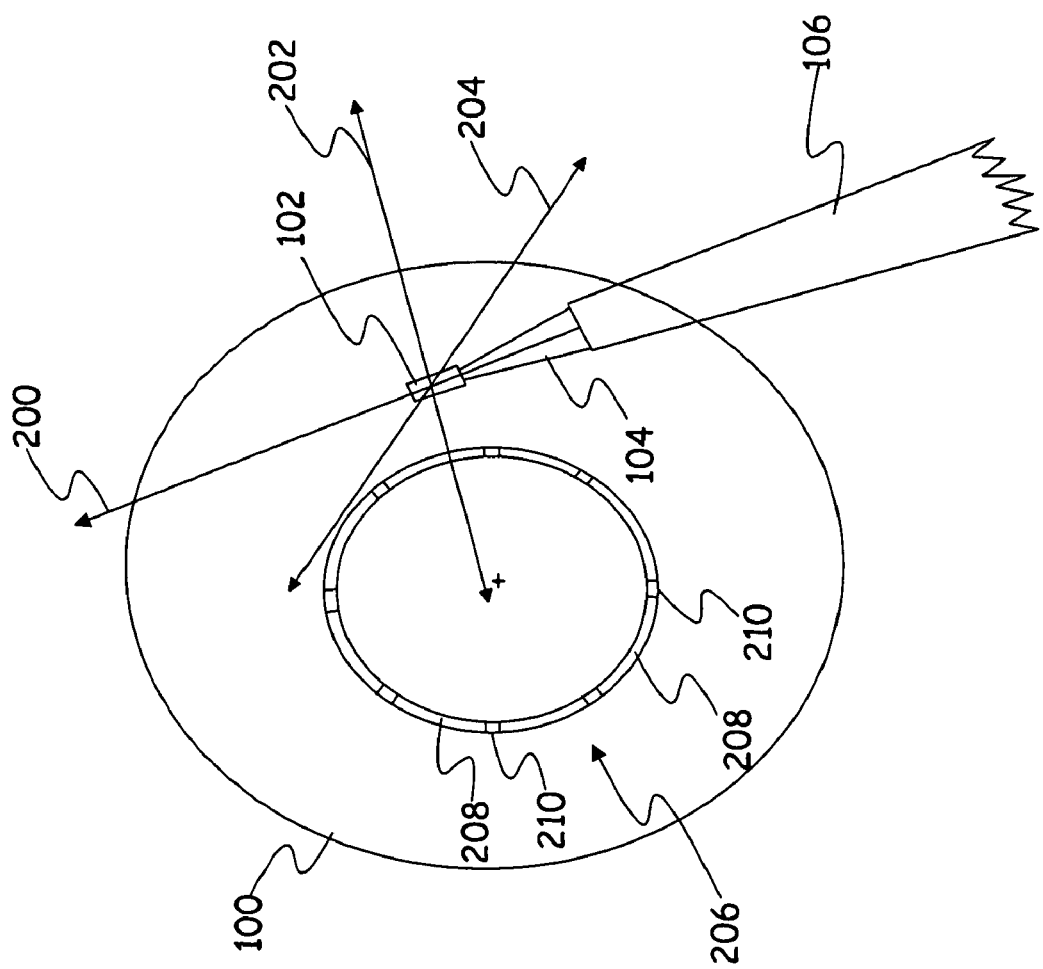
FIG. 2 is a diagrammatic illustration showing various components of relative transducer-media motion induced by slider-medium contact or near-contact.

FIG. 1 is a diagrammatic illustration showing mechanical components of a data storage system (for example, a disc drive) that are of relevance to some of the present embodiments. The same reference numerals are used in the various figures to represent the same or similar elements. FIG. 1 shows a data storage disc 100, a slider 102 that "flies" over the disc 100 and a suspension 104 and actuator 106 that support and help move the slider 102. Slider 102 includes a transducer 108 (which can include a read head or a read/write head, for example) that interacts with the data storage medium. An air bearing surface (ABS) 110 of the slider 102 faces the disc 100. Slider-medium contact can excite a variety of slider, gimbal (not separately shown), suspension, and actuator-arm modes that can induce one of or a combination of the following: (a) vertical motion of the transducer element 108 relative to the disc 100, (b) down-track motion of the transducer element 108 relative to the disc 100, and (c) cross-track motion of the transducer element 108 relative to the disc 100. In general, these components of motion of the transducer readback element relative to the medium will, in turn, induce variations in the form of modulation or transients in a readback signal and/or timing error signal and/or PES. FIG. 2 is a diagrammatic illustration showing various components of relative transducer-medium motion induced by slider-medium contact or near-contact. In FIG. 2, reference numeral 200 denotes down-track slider/transducer motion, reference numeral 202 denotes cross-track slider/transducer motion and reference numeral 204 represents motion of the slider/transducer relative to the medium along an out-of-plane (vertical) axis. Also, FIG. 2 illustrates a track 206 on a surface of disc 100. In FIG. 2, only one track is shown in the interest of simplification. However, a typical disc surface includes a very large number of closely spaced tracks. Each track (such as 206) includes data fields 208 interspersed with servo fields 210 that store positioning information that is utilized by a servo positioning system (not shown) to position slider 102 over a track such as 206. In general, a PES is generated while the disc 100 is rotating and during a track following operation. PES is a difference between a desired position of the slider/head 102 over the track 206 and an actual position of the slider/head 102. Similarly, during a track following operation, timing errors are generated, for example, when timing marks within different servo sectors 210 cannot be detected at a predetermined time interval.

Since a vertical component of relative slider-medium motion causes variation of the slider-medium clearance or fly-height (FH), this causes a change in an amplitude of the readback signal. Generally, frequencies corresponding to slider, slider assembly, and suspension modes lie below 1 megahertz (MHz) while the readback signal typically has frequencies well above 1 MHz. Therefore, the vertical component of relative slider-medium motion due to slider-medium contact induces a modulation of the readback signal amplitude. In the slider-medium proximity detection scheme, wavelet analysis is applied to capture low-frequency spectral components of the modulated readback signal corresponding to slider modes with much higher frequency resolution compared to conventional spectral analysis methods. This results in higher sensitivity (signal-to-noise ratio) compared to conventional spectral analysis using Fourier transforms or empirical orthogonal functions (EOF).

A down-track component of relative slider-medium motion causes frequency jitter or timing error of the readback signal. Timing error transients induced by slider modes excited during contact are analyzed by exploiting an inherent multi-resolution capability of wavelets.

Variations in PES induced by a cross-track component of head-media relative motion due to contact can be similarly identified using wavelet analysis. In this case, a sampling rate of the PES would need to be larger compared to the frequencies corresponding to the slider modes. For a typical disc drive system, a servo sampling rate is lower than most of the slider mode frequencies. Hence, dedicated tracks or data sectors with PES patterns yielding a Nyquist frequency higher than the largest frequency component of the slider modes would need to be used. Alternatively, if PES information is derived from data at a sufficiently large sampling rate, the wavelet-based scheme can be applied to this PES signal for proximity detection at any location on the disc.

Thus, in general, one or more different sensed signals from a transducer in a slider can be analyzed for proximity detection in accordance with the present embodiments. Also, as will be apparent from the description further below, a sensed signal from an external sensor proximate to, but separate from, the transducer can be analyzed for proximity detection in accordance with the present embodiments. In essence, in accordance with the present embodiments, a sensed signal from a sensor can be analyzed to determine if proximity exists between the sensor and an object that causes the sensor to produce the sensed signal.

Figure 3:
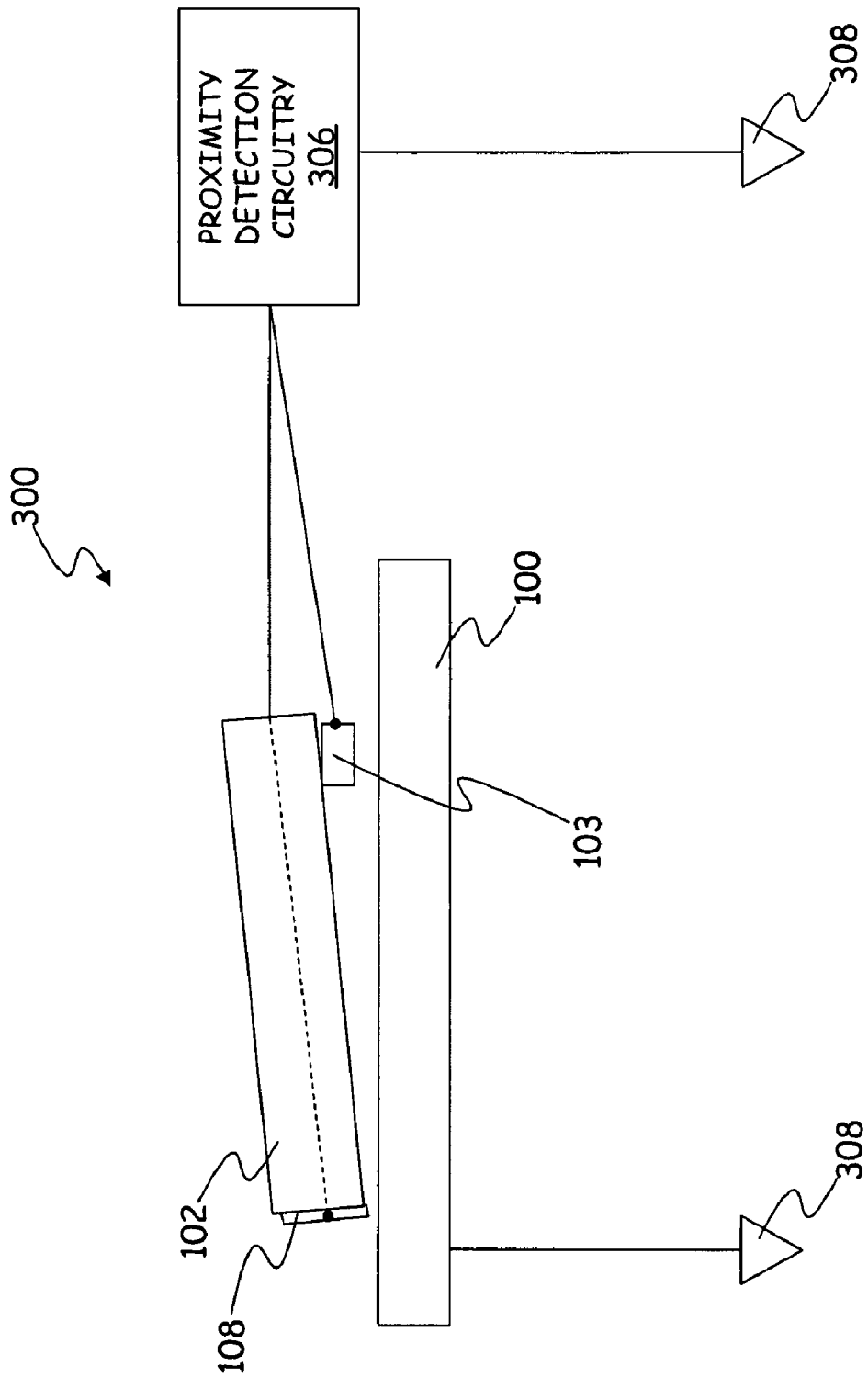
FIG. 3 is a simplified diagrammatic illustration of a circuit that includes elements for detecting proximity between a sensor (for example, a read mechanism such as a slider) and an object (for example, a storage medium in a data storage device) in accordance with some of the present embodiments.

FIG. 3 is a simplified diagrammatic illustration of a circuit 300 that includes elements for detecting proximity between a slider 102 and a data storage medium 100 in accordance with the present embodiments. In FIG. 3, inverted triangles 308 represent the circuit ground. For simplification, a suspension and actuator that support and move the slider 102 are not shown in FIG. 3. In disc drive-related applications, data storage medium 100 is a disc and circuit 300 is a part of a disc drive read channel. As noted earlier, in a disc drive, when disc 100 rotates, slider 102 flies just over disc 100. In accordance with the present embodiments, proximity detection circuit 306 detects proximity between slider 102 and data storage medium 100 by analyzing variations in a sensed signal obtained from a transducer 108 of slider 102, or from an external proximity detection sensor 103 proximate to transducer 103, during operation of a disc drive, for example, that includes the slider and the data storage medium. Examples of an external sensor 103 include an acoustic emission sensor, a magnetoresistive sensor, an inertial sensor and a thermal sensor. In general, any suitable external sensor can be used. Proximity detection component can comprise one or more of software and hardware that includes a memory with stored program code and a processor that is capable of executing the stored program code. Proximity detection component 306 utilizes a signal-analysis algorithm (for example, a wavelets-based algorithm) that is capable of analyzing any of a plurality of different types of sensed signals (a readback signal, a position error signal or a timing error signal from the transducer, or a sensed signal that is provided from a proximity detection sensor, which is separate from the transducer) and responsively providing an output indicative of whether proximity exists between a slider and a data storage medium.

The sensing system of one or more of the present embodiments may be used in a number of disc drive-related applications. It may be employed in a spin-stand tester for assessing component-level flyability and durability. It might also be used for drive-level reliability assessment of disc drives, both in their early mechanical phases and in fully functional drives. Screening of head gimbal assemblies (HGAs) in pre-production phases as well as production phases is possible with the present embodiments, whether the HGA employs a conventional metal gimbal or a "flex" (polymer-based) gimbal. Although the proximity sensing system may be implemented independently of systems that control the flying height of the slider, the output of proximity detection component 306 may be useful as an input to fly-height calibration and adaptive-fly-control systems that enable dynamic adjustment of flying height in certain disc drive systems. Those skilled in the art will recognize that still further applications exist for the system of the present embodiments due to its versatility and broad level of efficacy. For example, although the embodiment of FIG. 3 describes proximity detection between a slider and a data storage medium, the wavelet analysis technique described in connection with FIG. 3 can be utilized for proximity detection between any read mechanism (which may be structurally and functionally substantially different from a slider), that produces a sensed signal, and a data storage medium. In general, a proximity detection component or circuit (such as 306) is capable of applying wavelet analysis to a sensed signal from any suitable sensor and responsively providing an output indicative of whether proximity exists between the sensor and an object that causes the sensor to produce the sensed signal. Slider 102 is only a specific example of a sensor, and data storage medium 100 is only a specific example of an object. Also, a proximity detection component or circuit (such as 306) can be used in systems other than data storage systems. As used herein, a wavelet is a mathematical function used to divide a given function or continuous-time signal into different frequency components and to study each component with a resolution that matches its scale. A wavelet transform is the representation of a function by wavelets. Wavelet analysis involves analyzing a signal in time for its frequency content using wavelet functions. (See Amara Gaps. "An Introduction to Wavelets: Wavelet Analysis." [Online] 12 May 2004. <http://www.amara.com/IEEE-wave/IW_wave_ana.html>; Wikipedia foundations, Inc. "Wavelet." [Online] 30 Nov. 2008. <http://en.wikipedia.org/wiki/Wavelet>; and C. Valens "A Really Friendly Guide to Wavelets" [Online] 26 Feb. 2004. <http://pagesperso-orange.fr/polyvalens/clemens/wavelets/wavelets.html>.) A general description of wavelet analysis, which is used in some of the present embodiments, is provided below.

Wavelet Analysis and Its Benefits:

Sufficient time-frequency resolution is desired to effectively analyze and extract information from signals representing transient phenomena. One way of characterizing transient or non-stationary signals is using windowed or Short-Time Fourier transforms (STFT) defined by Equation (1) below.

$$X_{STFT}(f, s) = \int_{-\infty}^{\infty} x(t) \cdot g(t-s) \cdot e^{-j \cdot 2\pi \cdot f \cdot t} dt \quad \text{Equation (1)}$$

where g(t) is a windowing function. This function determines frequency (f) and time (t) resolution. Narrow windows give good time resolution but poor frequency resolution whereas broader windows yield good frequency resolution but poor time resolution.

Wavelets provide multi-resolution capability through the property of time-frequency localization, i.e., features of a signal can be studied at different levels of resolution, with a detail matched to a scale. Broad features can be analyzed on a larger scale while fine features can be analyzed at smaller scales. Wavelets are well suited to study short-time transient and non-stationary processes and are therefore applicable in the analysis of intermittent and short-duration contact events. This would not be possible with methods employing conventional spectral analysis and signal processing techniques.

A (continuous) wavelet transform of a variable x(t) is defined as $$C(a, s) = \int_{-\infty}^{\infty} x(t) \cdot \frac{1}{\sqrt{a}} \cdot \psi\left(\frac{t-s}{a}\right) dt \quad \text{Equation (2)}$$

where $\Psi_{a,s}(t)$ is referred to as the mother wavelet, 'a' is the scale parameter and 's' is the localization parameter.

When the scale 'a' increases, the wavelet becomes more spread out and captures long-time (low-frequency) behavior. When the scale is reduced, the wavelet captures short-time features (high-frequency) of the signal at the location characterized by 's'.

The wavelet function ψ(t) is chosen such that it has
(1) compact support to provide localization in time $$\int (|\psi(t)|)^2 dt = 1 \quad \text{Equation (3)}$$

and (2) a zero mean (admissibility condition) which provides an oscillatory or wave-like property.

$$\int_{-\infty}^{\infty} \psi(t) dt = 0 \quad \text{Equation (4)}$$

A normalization constant $1/\sqrt{a}$ is chosen so that the wavelet has the same energy for all scales 'a'.

In order to analyze sampled signals, scale and localization parameters need to be made discrete. A discrete form of the wavelet transform is therefore used.

Discrete Wavelet Transform (DWT):

Coefficients of the discrete wavelet transform are given by $$D_X(m, n) = a_0^{\frac{-m}{2}} \cdot \left[ \sum_k X(k) \cdot \psi^c\left(\frac{k - n \cdot a_0^m \cdot s_0}{a_0^m}\right) \right] \quad \text{Equation (5)}$$

In some of the present embodiments, discrete wavelets of a special form ($a_0=2$, $s_0=1$) are employed $$\psi_{m,n}(t) = 2^{\frac{-m}{2}} \cdot \psi(2^{-m} \cdot t - n) = 2^{\frac{-m}{2}} \cdot \psi\left(\frac{t - n \cdot 2^m}{2^m}\right) \quad \text{Equation (6)}$$

such that the set of functions {ψ[m, n]} for all m, n form an orthonormal basis and $\psi_{m,n}$ has compact support in [$2^m$ n, $2^m$ (n+1)]. This forms a non-redundant complete representation of the signal x(t) such that $$x(t) = \sum_m \sum_n D_X(m, n) \cdot \psi_{m,n}(t) \quad \text{Equation (7)}$$

The wavelet transform (6) is the discrete form of the well-known Haar wavelet transform. Generalizing the Haar wavelet transform using axioms of multi-resolution analysis, the discrete wavelet transform can be computed as follows.

$a_j(k)$ is defined as the scalar product of a signal sequence $X=\{x_j\}_{j=1, 2 \ldots M}$ and a dilated and translated scaling function φ(x), i.e., $$a_j(k) = <X, 2^{-j} \phi(2^{-j} x - k)>. \quad \text{Equation (8)}$$

The scaling function has the property $$\frac{1}{2} \cdot \phi\left(\frac{x}{2}\right) = \sum_n h(n) \cdot \phi(x - n) \quad \text{Equation (9)}$$

for a suitable vector of constant values h.

Equations (8) and (9) together give a recursive relationship for the scaling function coefficients $$a_{j+1}(k) = \sum_n h(n - 2 \cdot k) \cdot a_j(k).\qquad\text{Equation (10)}$$

The wavelet function satisfies the condition $$\frac{1}{2} \cdot \psi\left(\frac{x}{2}\right) = \sum_n g(n) \cdot \phi(x - n).\qquad\text{Equation (11)}$$

The discrete wavelet transform coefficients given by the inner product $$d_j(k) = \langle X, 2^{-j}\psi(2^{-j}x - k)\rangle \qquad\text{Equation (12)}$$

can then be obtained as $$d_{j+1}(k) = \sum_n g(n - 2 \cdot k) \cdot a_j(k).\qquad\text{Equation (13)}$$

One possible choice of wavelets for analyzing signals of interest to determine slider-medium contact are the Daubeschies wavelets. These are maximally flat or maximally regular wavelet functions, i.e., they have maximal flatness at normalized frequencies of 0 and π.

The computation of the DWT (Equation 5) can be carried out using a sub-band codification algorithm using digital filtering techniques. The signal is passed through a series of high-pass filters to analyze the high frequencies and passed through a series of low pass filters to analyze the low frequencies.

Figure 4:
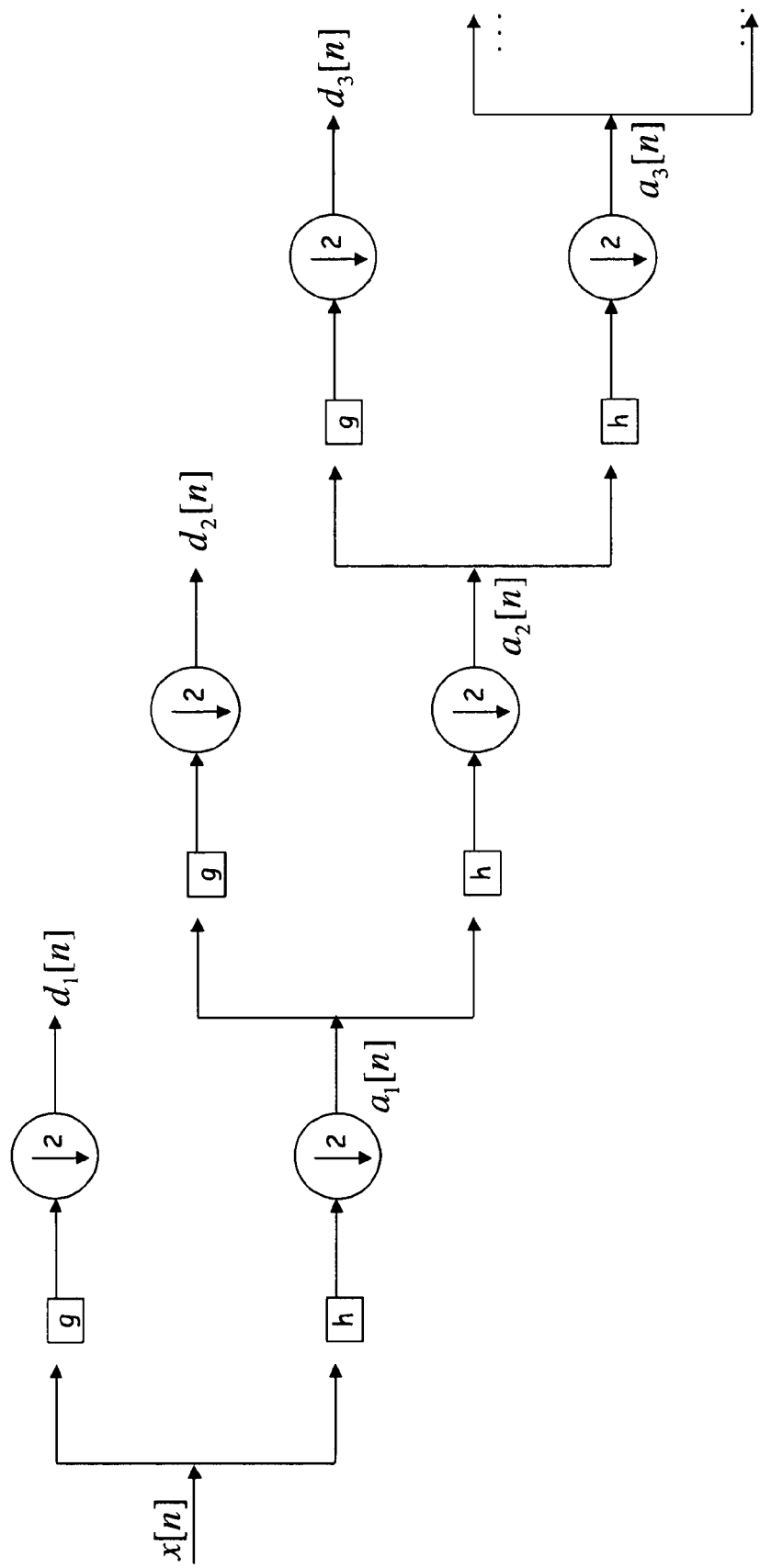
FIG. 4 is a simplified block diagram of a digital filtering-based implementation of a discrete wavelet transform using sub-band codification in accordance with one embodiment.

FIG. 4 is a simplified block diagram of a digital filtering-based implementation of a discrete wavelet transform using sub-band codification in accordance with one embodiment. In FIG. 4, coefficients $a_i$ ($a_1[n]$, $a_2[n]$, $a_3[n]$) and $d_i$ ($d_1[n]$, $d_2[n]$, $d_3[n]$) denote approximate and detailed versions of a signal at various scales and resolution. As can be seen in FIG. 4, a discrete signal sequence X[n] is passed through a half-band low-pass (LP) digital filter 'h' and a half-band high-pass (HP) digital filter 'g'. After passing through a half-band low-pass filter, half of the samples can be eliminated using Nyquist's rule, i.e., sub-sample the half-band LP output. The output of the HP filter is similarly down-sampled and this provides the first level detail or the first-level DWT coefficients. The down-sampled (by factor of 2) LP output is then again passed through 'h' and 'g' and the outputs thereof sub-sampled (by 2). The sub-sampled output of 'g' at this second level provide the second-level detail or second-level DWT coefficients. This process is continued as shown in FIG. 4 until the last set of samples are processed. The sub-sampled outputs of the LP filter 'h' and HP filter 'g' provide the approximations 'a' and details 'd' of the original signal. This can be expressed mathematically as $$a(k) = \sum_n x(n) \cdot h(2 \cdot k - n)\qquad\text{Equation (14)}$$

$$d(k) = \sum_n x(n) \cdot g(2 \cdot k - n)\qquad\text{Equation (15)}$$

The half-band filtering operations, followed by sub-sampling by two, halves the time resolution at each step, since only half the number of samples now characterize the entire signal record. However, since the frequency band at each new step now spans only half the previous frequency band, the frequency resolution is doubled at each successive step.

Description of Specific Slider-Medium Contact Detection Embodiments Using Wavelet Analysis As indicated above, various approaches can be applied to detection of slider-medium contact using wavelet analysis of the readback and/or timing error and/or PES and/or their variants or derivatives. These include, but are not limited to, the following possibilities.

1) A sufficiently long signal sequence is first LP-filtered or time-averaged and then down-sampled. A DWT is applied to the resulting (LP-filtered and down-sampled) data sequence. Wavelet components (coefficients) corresponding to the slider (or HGA) motion frequencies (a few tens of kilohertz (kHz) to a few hundreds of kilohertz, for example) are extracted. An energy amplitude or any other suitable function of these DWT coefficients is used as a metric to estimate a degree of contact or nearness to contact.

2) A DWT is applied directly to a sufficiently long discrete signal sequence. This would typically require a higher-order DWT.

3) Applying a continuous wavelet transform (CWT) (for example, Morlet wavelet transform) to obtain wavelet transform components at scales corresponding to slider/HGA-motion-induced frequencies. This technique is not usually well suited for real-time slider-medium contact detection embodiments.

Figure 5:
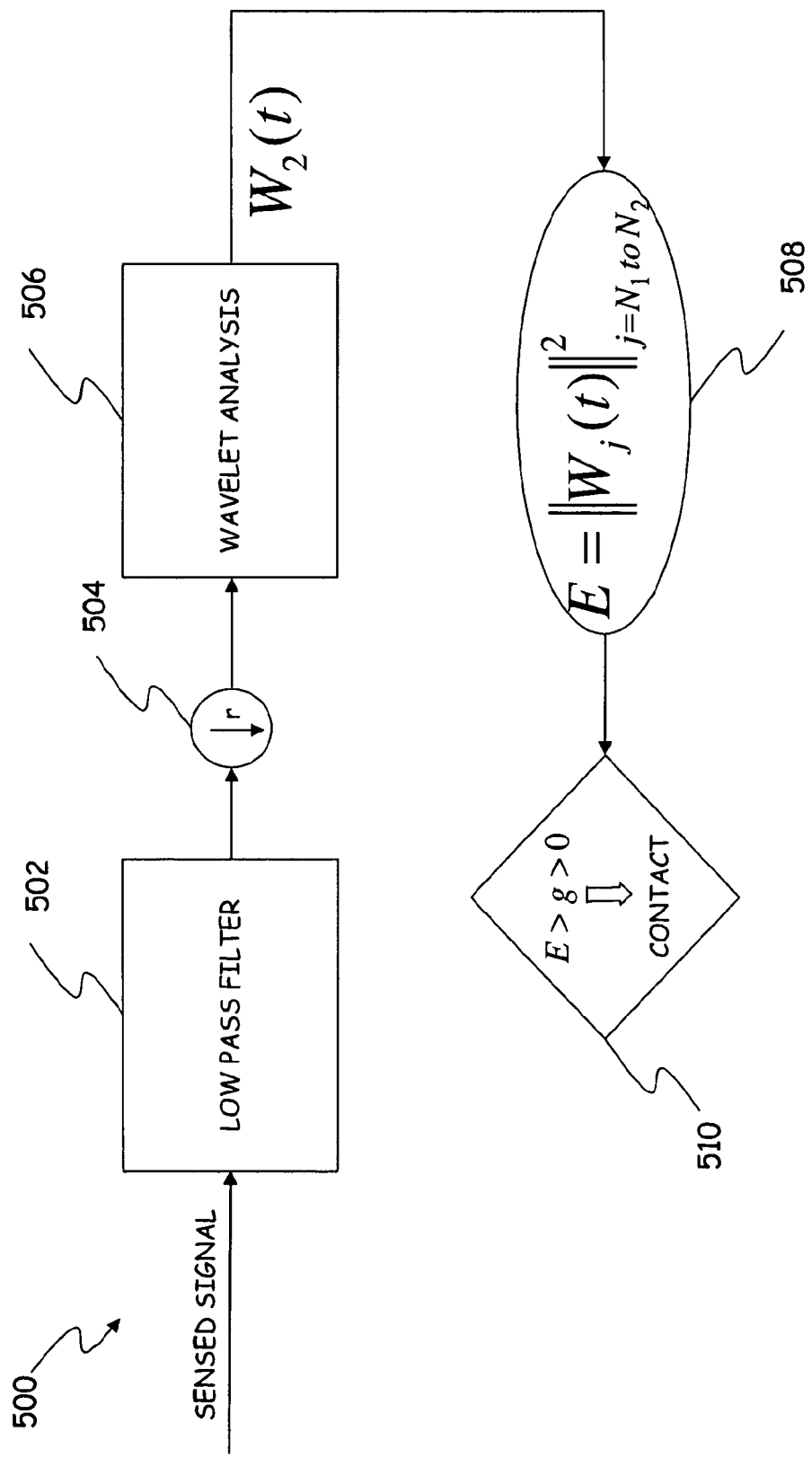
FIG. 5 is a block diagram of a method of determining a state of sensor-object proximity (for example, slider-medium proximity) using a discrete form of wavelet analysis of a suitable signal.

Although any of the approaches 1-3 can be applied to the problem of slider-medium contact detection, the first approach is computationally most efficient and easy to implement. A block diagram of this approach is shown in FIG. 5 and can be broadly described in terms of the following steps.

Step 1: A discrete signal sequence (readback signal, timing error signal or PES, for example) 500 of length 'n' is LP filtered or time averaged by LP filter 502 and down-sample by a factor 'r' denoted by reference numeral 504.

Step 2: A DWT (box 506) is applied to the resulting time-averaged, down-sampled signal sequence (size N=n/r). A relatively simple implementation of this step using digital filtering techniques uses the sub-band codification scheme shown in FIG. 4.

Step 3: DWT coefficients are extracted at scales corresponding to the frequency range of the slider/HGA motion and a suitable positive-definite, non-decreasing metric (for example, sum of squares, i.e., energy amplitude of these DWT coefficients) is obtained. This metric is used directly or a ratio is taken with respect to the energy amplitude corresponding to higher DWT coefficients to normalize scalar gain changes between measurements. Computations carried out at step 3 are denoted by reference numeral 508 in FIG. 5. In FIG. 5, N1 and N2 define the interval [N1, N2] of wavelet transform coefficients corresponding to a frequency band of slider motion (typically a few tens of kHz up to a few hundreds of kHz). The interval [N1, N2] may be further broken down into smaller sub-intervals that correspond to narrow ranges of HGA/slider modal frequencies.

Step 4: A threshold criterion is applied to determine a state of slider-medium contact. This is denoted by reference numeral 510 in FIG. 5.

In one embodiment of Approach 1, discrete wavelet analysis described in Equations (8) through (13) can be applied to analyze the signals of interest at scales corresponding to frequencies of dominant slider modes. The energy at these scales can then be compared to a threshold value to determine an onset of contact.

In another embodiment of Approach 1, DWT can be implemented using the sub-band codification scheme described schematically in FIG. 4. The energy contained in DWT coefficients corresponding to frequencies of dominant slider modes can then be compared to a threshold value to determine an onset of contact.

One set of discrete wavelets that can be used to detect slider-medium contact is a set of orthonormal maximally-flat (Daubeschies) wavelets that have maximal flatness in their frequency response at 0 and $\pi$. However, the proposed method does not preclude the use of other types of wavelets including but not limited to coiflets and bi-orthogonal wavelets.

The range of frequencies corresponding to the various slider modes of interest in slider-medium contact-detection varies depending on the design of the ABS, drive design, and on manufacturing tolerances. The DWT coefficients that should be included in the calculation of the energy amplitude corresponding to these modes can be chosen a priori, based on the contact signatures for a given drive design. The set of DWT coefficients can also be adaptively varied if required, in the event of variations in contact conditions (for example, different temperature, altitude, humidity conditions) and properties of the contact interface over time (for example, due to wear of the head and media overcoats and depleted lube).

Different metrics as functions of the DWT coefficients corresponding to the slider-induced transients or modulation in the signal can be used in determining the criterion for contact. A squared sum amplitude is one of many metrics that can be used. Further, the metric may optionally be normalized with respect to its value corresponding to higher-order DWT coefficients to factor out effects of changes in scalar gain in the signal amplitude. Such scalar gain effects can occur, for example, due to changes in channel preamplifier gain during reads at different times or effects of variations in written-in field amplitudes due to changes in preamplifier gains during writes at different times.

Benefits of Slider-Medium Contact Detection Scheme

Benefits of the slider-medium contact detection scheme include:

1) An ability to detect slider-medium contact at any location on a disc.
2) Sensitivity to detect intermittent and short-duration contact events (within 2-3 data sectors, for example).
3) Applicability to real-time monitoring of slider-medium contact; length of signal sequences required for contact determination is much smaller compared to amplitude modulation (AM)/frequency modulation (FM) demodulation-based schemes and existing PES-based schemes.
4) Higher sensitivity compared to AM/FM demodulation-based techniques and PES-based schemes.
5) Relatively simple implementation using digital filtering techniques at relatively low computational cost.
6) No requirement for special data patterns to be written on the storage medium for slider-medium contact detection.
7) Robust against variations, within limits, in contact conditions—does not require tuning of parameters of the detection scheme or filter taps. Parameters (set of DWT coefficients) of the detection scheme and choice of wavelets can be made a priori during factory setting.
8) Any changes to the choice of wavelets can be easily made by switching between different pre-set digital filters. This makes the scheme easily adaptable to optimally detect contact events of different kinds such as short duration versus long-duration contacts.
9) The same architecture and implementation can be applied to multiple signals such as readback signal and timing error signal. This reduces the hardware and firmware complexity required for the implementation of the scheme.

It is to be understood that even though numerous characteristics and advantages of various embodiments have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular type of system (disc drive, spinstand tester, etc.) in which the sensor-object proximity detection technique is used without departing from the spirit and scope of the present disclosure.

What is claimed is:

1. A circuit comprising:
   a proximity detection component configured to apply wavelet analysis to a sensed signal from a sensor to obtain a response that corresponds to modal frequencies that are excited due to proximity between the sensor and an object that causes the sensor to produce the sensed signal, wherein the proximity detection component is configured to apply the wavelet analysis by utilizing wavelet components that are adaptively variable based on a variation of a sensor-object interface; and
   an output indicative of whether proximity exists between the sensor and the object based on the obtained response.

2. The circuit of claim 1 wherein the sensor is a read mechanism and the object is a data storage medium.

3. The circuit of claim 2 wherein the sensed signal provided from the read mechanism is a readback signal, a position error signal or a timing error signal, or a signal related to the readback signal, the position error signal or the timing error signal.

4. The circuit of claim 1 wherein the sensor is a proximity detection sensor and the object that causes the proximity detection sensor to produce the sensed signal is a data storage medium.

5. The circuit of claim 1 and further comprising a read mechanism that reads data from the object, the object being a data storage medium.

6. The circuit of claim 5 wherein the sensor is a proximity detection sensor that is coupled to the read mechanism.

7. The circuit of claim 6 wherein the proximity detection sensor is one of an acoustic emission sensor, a magnetoresistive sensor, an inertial sensor or a thermal sensor.

8. The circuit of claim 1 wherein the proximity detection component is configured to apply wavelet analysis to the sensed signal by applying a continuous wavelet transform to the sensed signal.

9. The circuit of claim 1 wherein the proximity detection component is configured to apply wavelet analysis to the sensed signal by:
   sampling the sensed signal; and
   applying a discrete wavelet transform to the sampled sensed signal.

10. The circuit of claim 1 wherein the proximity detection component is configured to apply wavelet analysis to the sensed signal by:
    sampling the sensed signal;
    filtering the sampled sensed signal; and
    applying a discrete wavelet transform to the filtered sampled sensed signal.

11. The circuit of claim 1 wherein the proximity detection component is configured to apply wavelet analysis to the sensed signal from the sensor and to provide the output indicative of whether proximity exists between the sensor and the object by:
 computing wavelet coefficients for the sensed signal; and
 comparing a non-decreasing and positive-definite metric of the computed wavelet coefficients to a predetermined threshold.

12. The circuit of claim 1 wherein the proximity detection component is configured to apply wavelet analysis to the sensed signal from the sensor and to provide the output indicative of whether proximity exists between the sensor and the object by:
 computing wavelet coefficients for the sensed signal;
 determining a statistical variation of the computed wavelet coefficients; and
 determining whether proximity exists between the sensor and the object based on the statistical variation of the computed wavelet coefficients.

13. The circuit of claim 1 wherein the proximity detection component is configured to apply wavelet analysis to the sensed signal by:
 sampling the sensed signal;
 filtering the sampled sensed signal; and
 applying a discrete wavelet transform to the filtered sampled sensed signal, wherein applying a discrete wavelet transform to the filtered sampled sensed signal comprises:
 computing wavelet coefficients for the sensed signal; and
 comparing a non-decreasing and positive-definite metric of the computed wavelet coefficients to a predetermined threshold.

14. A circuit comprising:
 a proximity detection component configured to apply wavelet analysis to a sensed signal from a sensor and to responsively provide an output indicative of whether proximity exists between the sensor and an object that causes the sensor to produce the sensed signal by:
 computing wavelet coefficients for the sensed signal; and
 comparing a non-decreasing and positive-definite metric of the computed wavelet coefficients to a predetermined threshold.

15. The circuit of claim 14 wherein the sensor is a read mechanism and the object is a data storage medium.

16. The circuit of claim 15 wherein the sensed signal provided from the read mechanism is a readback signal, a position error signal or a timing error signal, or a signal related to the readback signal, the position error signal or the timing error signal.

17. The circuit of claim 14 and further comprising a read mechanism that reads data from the object, the object being a data storage medium.

18. The circuit of claim 14 wherein the sensor is coupled to the read mechanism.

19. A method comprising:
 receiving a sensed signal from a sensor;
 applying wavelet analysis to the received sensed signal to obtain a response that corresponds to modal frequencies that are excited due to proximity between the sensor and an object that causes the sensor to produce the sensed signal, wherein applying the wavelet analysis is carried out by utilizing wavelet components that are adaptively variable based on a variation of a sensor-object interface; and
 based on the obtained response, providing an output indicative of whether proximity exists between the sensor and the object.

20. The method of claim 19 wherein applying wavelet analysis to the received sensed signal, and providing the output indicative of whether proximity exists between the sensor and the object comprises:
 sampling the received sensed signal;
 filtering the sampled received sensed signal; and
 applying a discrete wavelet transform to the filtered sampled sensed signal,
 wherein applying a discrete wavelet transform to the filtered sampled sensed signal comprises:
 computing wavelet coefficients for the sensed signal;
 determining a statistical variation of the computed wavelet coefficients; and
 determining whether proximity exists between the sensor and the object based on the statistical variation of the computed wavelet coefficients.

\* \* \* \* \*